United States Patent
Iozia et al.

(10) Patent No.: US 12,106,170 B2
(45) Date of Patent: Oct. 1, 2024

(54) RFID DEVICE FOR TIRES

(71) Applicant: Bridgestone Europe NV/SA, Zaventem (BE)

(72) Inventors: Francesco Iozia, Rome (IT); Cecilia Occhiuzzi, Rome (IT); Gaetano Marrocco, Rome (IT); Simone Nappi, Rome (IT)

(73) Assignee: Bridgestone Europe NV/SA, Zaventem (BE)

( * ) Notice: Subject to any disclaimer, the term of this patent is extended or adjusted under 35 U.S.C. 154(b) by 471 days.

(21) Appl. No.: 17/424,303

(22) PCT Filed: Feb. 3, 2020

(86) PCT No.: PCT/IB2020/050829
§ 371 (c)(1),
(2) Date: Jul. 20, 2021

(87) PCT Pub. No.: WO2020/170057
PCT Pub. Date: Aug. 27, 2020

(65) Prior Publication Data
US 2022/0134814 A1 May 5, 2022

(30) Foreign Application Priority Data
Feb. 18, 2019 (IT) .................... 102019000002337

(51) Int. Cl.
*G06K 19/077* (2006.01)
*G06K 19/07* (2006.01)
(Continued)

(52) U.S. Cl.
CPC ... *G06K 19/07764* (2013.01); *G06K 19/0723* (2013.01); *G06K 19/07722* (2013.01);
(Continued)

(58) Field of Classification Search
CPC ......... G06K 19/07764; G06K 19/0723; G06K 19/07722; G06K 19/0779; G06K 19/0717;
(Continued)

(56) References Cited

U.S. PATENT DOCUMENTS 5,479,171 A * 12/1995 Schuermann ...... G06K 7/10346
342/51
2004/0182494 A1* 9/2004 Dominak ............ B60C 23/0493
156/110.1
(Continued)

FOREIGN PATENT DOCUMENTS

CN 201489565 U 5/2010
CN 103546188 A 1/2014
(Continued)

OTHER PUBLICATIONS

Study on the Philosophy and Mechanism of Industry and Information Technology Organic Integration, Yu Zhang et al.
(Continued)

*Primary Examiner* — Ryan W Sherwin
(74) *Attorney, Agent, or Firm* — Patterson Intellectual Property Law, PC

(57) ABSTRACT

The invention concerns a patch RFID device (1A, 1B, 2, 3) for tires, designed to be applied to an inner liner of a tire before or after tire vulcanization/curing and comprising an innovative flexible multilayer planar structure.

20 Claims, 4 Drawing Sheets

(51) Int. Cl.
- *H01Q 1/22* (2006.01)
- *H01Q 1/38* (2006.01)
- *H01Q 9/04* (2006.01)
- B60C 23/04 (2006.01)

(52) U.S. Cl.
CPC ....... *G06K 19/0779* (2013.01); *H01Q 1/2241* (2013.01); *H01Q 1/38* (2013.01); *H01Q 9/0414* (2013.01); *B60C 23/0452* (2013.01); *B60C 23/0493* (2013.01); *G06K 19/0717* (2013.01)

(58) Field of Classification Search
CPC ...... H01Q 1/2241; H01Q 1/38; H01Q 9/0414; B60C 23/0452; B60C 23/0493; B60C 2019/004; B60C 11/243; B60C 11/246; B60C 23/06; B60C 23/04
See application file for complete search history.

(56) References Cited

U.S. PATENT DOCUMENTS

| | | | |
|---|---|---|---|
| 2005/0275518 A1* | 12/2005 | Adamson | B60C 23/0493 340/447 |
| 2011/0259497 A1* | 10/2011 | Borot | B60C 19/00 524/588 |
| 2012/0152028 A1 | 6/2012 | Ko et al. | |
| 2015/0248569 A1* | 9/2015 | Rushing | G01C 15/04 340/10.34 |
| 2017/0358839 A1* | 12/2017 | Wu | H01Q 1/2225 |
| 2018/0053083 A1* | 2/2018 | Gaspari | H01Q 1/2283 |

FOREIGN PATENT DOCUMENTS

| | | |
|---|---|---|
| EP | 14598911 A1 | 9/2004 |
| WO | 2016193457 A1 | 12/2016 |
| WO | 2017130956 A1 | 8/2017 |

OTHER PUBLICATIONS

Key Technology and System Design for LTE Multimode Terminal, Haiqiang Li.
China National Intellectual Property Administration Second Office Action, dated Apr. 12, 2023, 17 pages.
Translation of the First Office Action for corresponding patent application No. CN 202080014893.9, dated Sep. 20, 2022, 12 pages.
Office Action for Japanese counterpart patent application No. 2021-548157, dated Dec. 20, 2022, 4 pages.
International Search Authority International Search Report for corresponding International Patent Application No. PCT/IB2020/050829 dated Mar. 26, 2020, 4 pages.

* cited by examiner

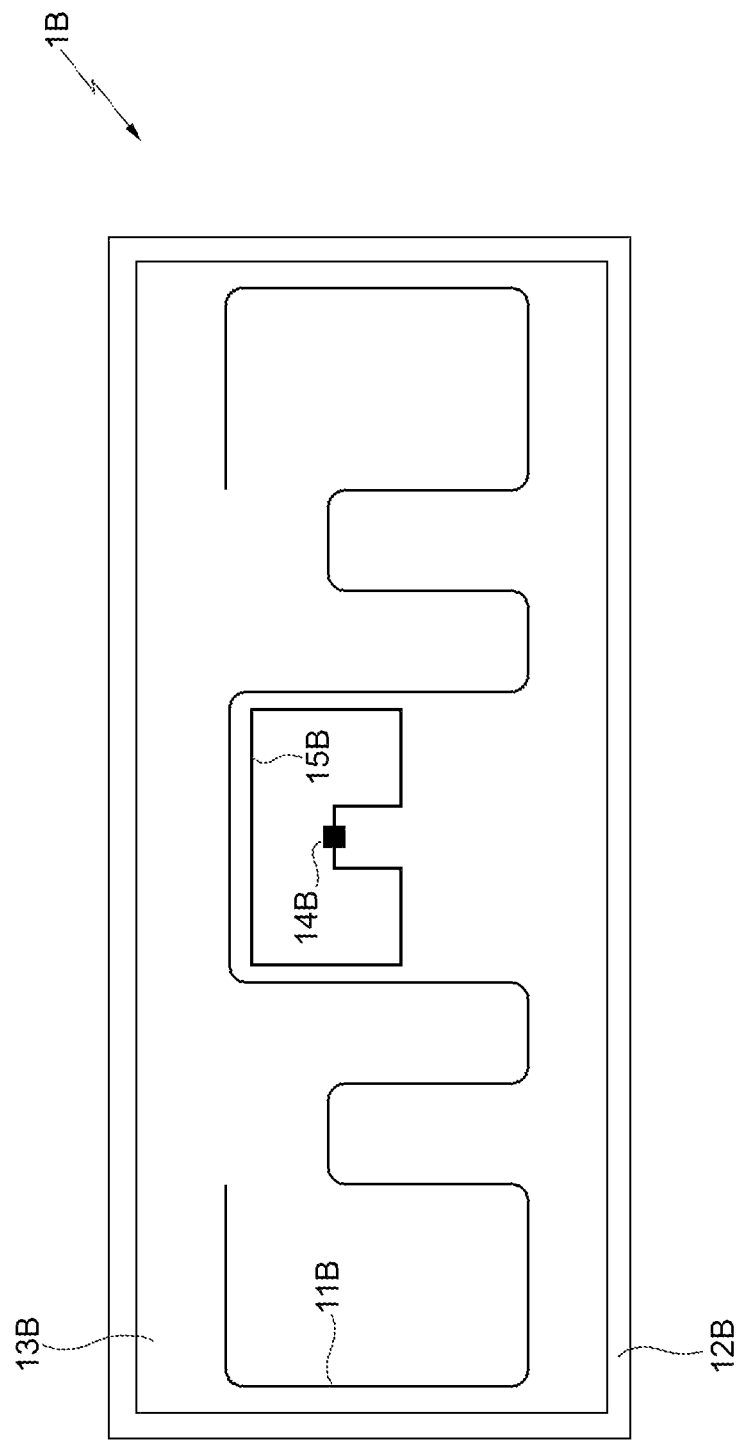

RFID DEVICE FOR TIRES

TECHNICAL FIELD OF THE INVENTION

The present invention relates to an improved radiofrequency identification (RFID) device for use in tires.

STATE OF THE ART

In tire sector, it is felt the need for solutions enabling automated and univocal identification of tires during manufacturing, use and disposal thereof.

For example, with specific reference to tire manufacture, automated and univocal identification of tires may allow optimizing manufacturing processes and logistics operations, boosting the use of automated control systems, performing an efficient tire tracking/tracing and, hence, realizing smart tire factories.

In this context, the use of barcodes applied to tires to manage tire production and production history of individual tires is known. However, this solution has its limitations since printed barcodes allow registration of a limited number of information items, need to be read one by one with a given line of sight, and run the risk of being deleted or corrupted during manufacturing and/or normal operation/use of tires, thereby becoming illegible or, anyway, difficult to read.

In order to solve such limitations, US 2016/0092814 A1 proposes using a tire identification system based on radiofrequency identification (RFID) tags. In particular, US 2016/0092814 A1 discloses a tire production management system using RFID tags, whose operation includes: attaching an RFID tag to a tire before producing a finished tire in tire manufacturing processes; recognizing the tire tag attached to the tire in each of manufacturing processes; and thus managing information according to a manufacturing process on an individual tire. The tire production management system according to US 2016/0092814 A1 comprises: an RFID tag attachment part; a plurality of RFID readers; a plurality of management terminals for respective processes; a lot management server; and a tire production management server.

Moreover, Italian patent application No. 102016000009727 discloses a configurable and tunable radiofrequency wireless sensor device that may be advantageously integrated/incorporated into, or applied to, a tire to provide automatic identification of the tire during its manufacturing, during logistics operations and also during its normal operation. Additionally, the configurable and tunable radiofrequency wireless sensor device according to 102016000009727 may be conveniently configured to provide also diagnostic data, such as temperature or pressure data.

Furthermore, WO 2018/104621 A1 discloses a method for manufacturing a rubber patch comprising a radiofrequency transponder and a tire comprising such a rubber patch, wherein said rubber patch has a first layer and a second layer, that involves molding and vulcanizing a first layer, the outer surface of which comprises a recess suitable for receiving a radiofrequency transponder, placing a transponder in said recess and then positioning and vulcanizing a second layer in order to embed the transponder between the two layers.

In this connection, it is worth noting that embedding an RFID tag (that is typically a rigid metallic body) in a tire (that is, instead, an elastic and highly flexible body) may cause damages to the tire or to cords thereof (e.g., it may cause tire layer separation/delamination, cord breakage, etc.) during manufacturing of the tire (e.g., during tire vulcanization/curing) and also during its normal operation, with consequent safety risks.

US2012152028 discloses a slim self-powering power supplier using a flexible PCB for a wireless sensor network and a sensor node using the same, and a fabrication method thereof.

CN201489565 discloses a flexible UHF frequency range RFID label which comprises a substrate, an antenna and a chip, wherein the substrate is a soft synthesized resin body, and the antenna is a printed circuit and includes a first antenna and a second antenna.

WO2016193457 discloses a radiofrequency transponder corresponding to the assembly, without electromechanical connection, of a radiating antenna and an electronic part wherein the radiating antenna is a single-strand coil spring forming a dipole antenna.

EP1459911 discloses a method of attaching a tag to the inner surface of a tire including coating a tag or a premask film with a pressure sensitive adhesive on a side and adhering that side of the tag or premask to the inner surface of a tire.

OBJECT AND SUMMARY OF THE INVENTION

The Applicant has carried out an in-depth study in order to develop an improved RFID device for use in tires, thereby conceiving the present invention.

Thence, a general object of the prevent invention is that of providing an RFID device for tires with enhanced performance and features with respect to those of currently known solutions.

Moreover, a specific object of the present invention is that of providing an RFID device such that to avoid causing damages to tires or to cords thereof.

These and other objects are achieved by the present invention in that it relates to a patch radiofrequency identification (RFID) device for tires, as defined in the appended claims.

More specifically, the present invention concerns a patch RFID device for tires, designed to be applied to an inner liner of a tire before or after tire vulcanization/curing and comprising a flexible multilayer planar structure including:
  a substrate;
  a first insulating layer covering a first portion of the substrate, thereby leaving exposed a second portion thereof extending around said first portion;
  an RFID chip and a first antenna that are connected to each other and arranged on the first insulating layer;
  a second antenna that is electromagnetically coupled with the first antenna and that extends, at least partially, on the first insulating layer; wherein the RFID chip, the first antenna and the second antenna lie on one and the same plane; and
  a second insulating layer covering the first insulating layer, the RFID chip, the first antenna and, at least partially, the second antenna.
  Conveniently, the second antenna:
  either extends partially on the first insulating layer and partially on the second portion of the substrate and is partially covered by the second insulating layer;
  or extends completely on the first insulating layer and is completely covered by the second insulating layer.
  More conveniently, the second antenna includes:
  a first portion that extends on the first insulating layer and is covered by the second insulating layer; and
  a second portion that either extends from said first portion on the first insulating layer and is covered by the second insulating layer, or extends from said first portion on the second portion of the substrate and is not covered by the second insulating layer.

Conveniently, the multilayer planar structure further includes a top rubber layer covering the second insulating layer and the second portion of the substrate (and also the second portion of the second antenna, if it extends on the second portion of the substrate), wherein said top rubber layer is designed to be applied to an inner liner of a tire.

Alternatively, the multilayer planar structure is conveniently designed to be applied to an inner liner of a tire so that the inner liner covers the second insulating layer and the second portion of the substrate (and also the second portion of the second antenna, if it extends on the second portion of the substrate).

Differently, the patch RFID device can conveniently comprise a patch formed by two or more layers, wherein said patch encapsulates the multilayer planar structure and is designed to be applied to an inner liner of a tire.

Conveniently, the first antenna is designed to operate as a near-field coupler, and the second antenna is designed to operate as a far-field radiating antenna.

Preferably, the second antenna is a parasitic radiator that can be conveniently formed by:
 a meander-line-shaped conductive wire, or
 a straight conductive wire, or
 an assembly of twisted conductive wires, or
 an assembly of twisted conductive and non-conductive wires.

Preferably, the first antenna is a two-dimensional (2D) folded structure (e.g., having a loop-like or circular or rectangular or square or meander-line-like or spiral-like shape).

Conveniently, the second antenna is formed by an assembly of twisted conductive wires or by an assembly of twisted conductive and non-conductive wires; wherein:
 relative positions of the first antenna and of the first portion of the second antenna are such that to achieve electromagnetic coupling between the two antennas;
 the first portion of the second antenna includes two ends located at opposite sides of the first antenna; and
 the second portion of the second antenna includes two straight arms extending in opposite directions from the first antenna, each from a respective end of the first portion of the second antenna.

More conveniently, the second antenna is formed by an assembly of twisted conductive and non-conductive wires; wherein the multilayer planar structure further includes a reinforcement mesh attached on the RFID chip, the first antenna, the first insulating layer and, at least partially, the second portion of the substrate; and wherein the assembly of twisted conductive and non-conductive wires is interlaced with the reinforcement mesh so that said reinforcement mesh causes said assembly of twisted conductive and non-conductive wires to maintain shapes of the first portion and the second portion of the second antenna.

Otherwise, the second antenna may be conveniently formed by a straight assembly of twisted conductive wires, or of twisted conductive and non-conductive wires.

Conveniently, the RFID chip is configured to:
 store an univocal identifier assigned to the tire in which the patch RFID device is embedded;
 receive, via the second and the first antennas, interrogation signals from RFID readers; and
 transmit, via the first and the second antennas, backscattered interrogation signals carrying the univocal identifier.

Preferably, the RFID chip is configured to perform a self-tuning of a respective input impedance and/or of an input impedance of the first and second antennas so as to compensate for varying surrounding dielectric/electromagnetic conditions.

Preferably, a temperature sensor is integrated in the RFID chip to measure temperature values; wherein the RFID chip is configured to transmit, via the first and the second antennas, backscattered interrogation signals carrying the temperature values measured by the temperature sensor.

Conveniently, the first insulating layer is attached to the substrate by means of a first adhesive material/layer, and the top rubber layer or the inner liner is attached to the second insulating layer by means of a second adhesive material/layer.

Conveniently, a protective resin is interposed between:
 the RFID chip and the first antenna, and
 the second insulating layer.

Conveniently, the substrate is made of rubber, or of one or more polymeric materials, or of paper, or of textile/fabric.

BRIEF DESCRIPTION OF THE DRAWINGS

For a better understanding of the present invention, preferred embodiments, which are intended purely by way of non-limiting examples, will now be described with reference to the attached drawings (all not to scale), where:

FIGS. 1A and 1B schematically illustrate a first patch RFID device and a second patch RFID device according to two alternative embodiments of the present invention;

DETAILED DESCRIPTION OF PREFERRED EMBODIMENTS OF THE INVENTION

Figure 1A:
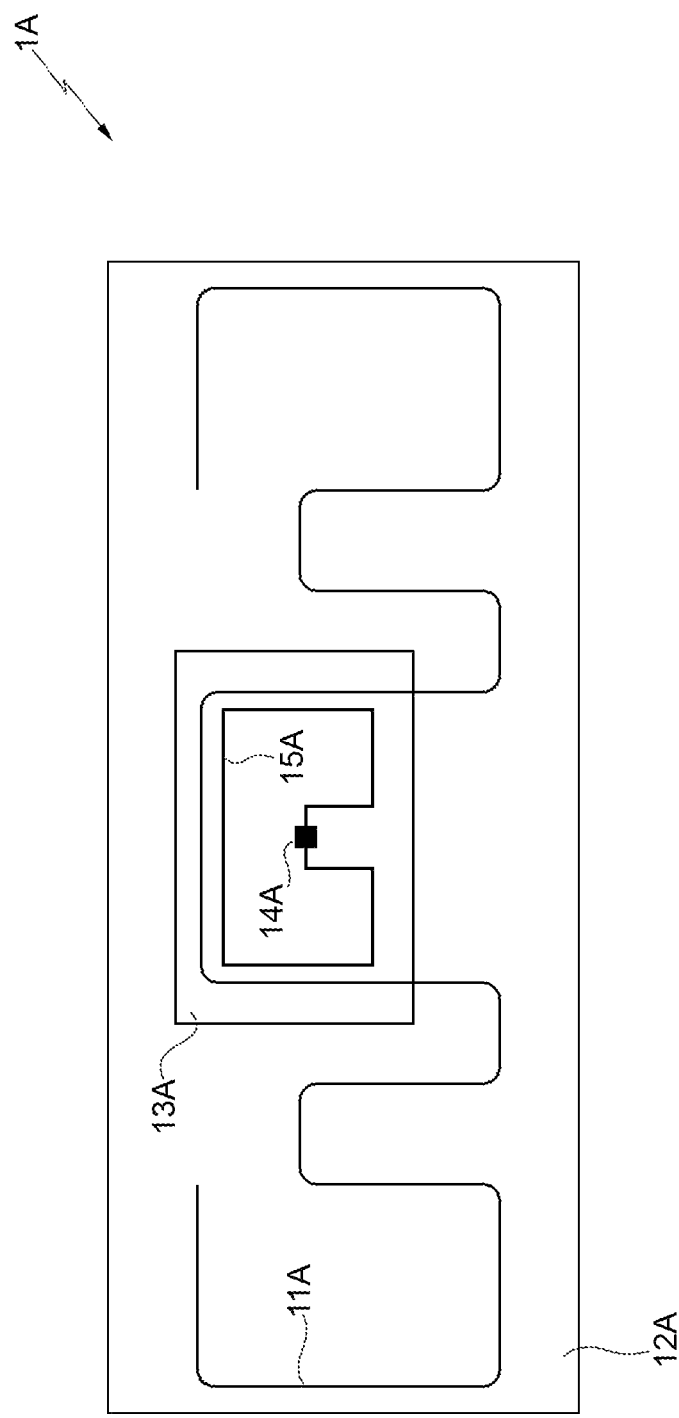

The following discussion is presented to enable a person skilled in the art to make and use the invention. Various modifications to the embodiments shown and described will be readily apparent to those skilled in the art, without departing from the scope of the present invention as claimed. Thence, the present invention is not intended to be limited to the embodiments shown and described, but is to be accorded the widest scope of protection consistent with the principles and features disclosed herein and defined in the appended claims.

The present invention concerns a patch radiofrequency identification (RFID) device for tires, comprising a flexible multilayer planar structure that includes:
 a (planar and flexible) substrate made of a given material (preferably rubber, e.g. of inner liner type; however, even other materials could be conveniently used, such as a polymeric material, paper, textile/fabric, etc.);
 a first (planar and flexible) insulating layer covering a first portion of the substrate, thereby leaving exposed a second portion of the substrate, which second portion extends around the first portion of said substrate;
 an RFID chip and a first (flexible) antenna that are connected to each other and arranged on the first insulating layer;

a second (flexible) antenna that is electromagnetically coupled (preferably, inductively coupled) with the first antenna and that extends, at least partially, on the first insulating layer (wherein the first antenna is conveniently designed to operate as a near-field coupler, and the second antenna is conveniently designed to operate as a far-field radiating antenna); and a second (planar and flexible) insulating layer covering the first insulating layer, the RFID chip, the first antenna and, at least partially, the second antenna.

In particular, the RFID chip, the first antenna and the second antenna substantially lie on one and the same plane.

Conveniently, the second antenna:
either extends partially on the first insulating layer and partially on the second portion of the substrate and is partially covered by the second insulating layer;
or extends completely on the first insulating layer and is completely covered by the second insulating layer.

More conveniently, the second antenna includes:
a first portion that extends on the first insulating layer and is covered by the second insulating layer; and
a second portion that
either extends from said first portion on the first insulating layer and is covered by the second insulating layer,
or extends from said first portion on the second portion of the substrate and is not covered by the second insulating layer.

Preferably, the multilayer planar structure further includes a top (planar and flexible) rubber layer covering the second insulating layer and the second portion of the substrate (and also the second portion of the second antenna, if it extends on the second portion of the substrate), wherein said top rubber layer is designed to be applied to an inner liner of a tire.

Alternatively, the multilayer planar structure does not include the top rubber layer and is conveniently designed to be applied to an inner liner of a tire so that the inner liner covers the second insulating layer and the second portion of the substrate (and also the second portion of the second antenna, if it extends on the second portion of the substrate), thereby acting as said top rubber layer.

Differently, the patch RFID device can conveniently comprise a patch formed by two or more layers, wherein said patch encapsulates the multilayer planar structure and is designed to be applied to an inner liner of a tire. In this case, the multilayer planar structure can conveniently include also one or more additional layers, such as one or more additional layers:
made of soft material(s) for absorbing mechanical stress during tire rolling, and/or
allowing adhesion to rubber, and/or
allowing trapped air to escape while preventing rubber flow, and/or
having electromagnetic properties such that to optimize RFID communication performance (e.g., in terms of impedance matching and losses).

As just explained, the patch RFID device according to the present invention is designed to be applied to the inner liner of a tire, preferably before tire vulcanization/curing (however, it is worth noting that the patch RFID device could be conveniently applied to the inner liner of a tire also after tire vulcanization/curing). The flexible multilayer planar structure provides a highly strong integral adhesion of the patch RFID device to the inner liner, also during normal operation/use of the tire.

In this connection, it is worth noting that, as previously explained, traditional rigid RFID tags, when embedded in tires, may cause damages to the tires or to cords thereof during tire manufacturing (e.g., during tire vulcanization/curing) and also during tire normal operation, with related safety risks. Instead, the flexible multilayer planar structure of the patch RFID device according to the present invention is such that to avoid any damage to the tire and to the cords thereof (in particular, thanks to its extremely reduced gauge/thickness and its flexibility).

Moreover, since the RFID chip, the first antenna and (at least) the first portion of the second antenna are fixedly/integrally attached/formed on the first insulating layer, mutual positions of the first antenna and of the first portion of the second antenna are maintained fixed (i.e., coupling geometry between said first antenna and said first portion of the second antenna is maintained fixed) during tire vulcanization/curing and, then, during normal operation/use of the tire, thereby preventing degradation of RFID communication performance due to mutual displacement of the two antennas.

Additionally, the use of a rubber substrate and, if present, also of the top rubber layer in the flexible multilayer planar structure allows, after tire vulcanization/curing, to firmly attach the patch RFID device to the inner liner, wherein the RFID chip and the first and second antennas are encapsulated in the two rubber layers (i.e., the rubber substrate and the top rubber layer) without air inside.

Moreover, the use of a rubber substrate in the patch RFID device matches current tire manufacturing process/machinery and allows increasing tire assembly production efficiency (above all, when the inner liner acts as the top rubber layer).

Conveniently, the first insulating layer is attached to the substrate by means of a first adhesive material/layer, and the top rubber layer or the inner liner is attached to the second insulating layer by means of a second adhesive material/layer.

Preferably, in order to further strengthen adhesion, a protective resin is interposed between:
the RFID chip and the first antenna (and, conveniently, also (at least) the first portion of the second antenna), and
the second insulating layer.

Conveniently, the first and second insulating layers are made of an insulating material, such as a plastic polymer (e.g., polyethylene terephthalate (PET), polyethylene (PE), polyvinyl chloride (PVC), biaxially-oriented polyethylene terephthalate (BoPET—e.g., mylar), Kapton, etc.); however, even other insulating materials could be conveniently used, such as paper and natural or synthetic fibers.

Preferably, the second antenna is a parasitic radiator.

According to a first preferred embodiment of the present invention, the second antenna can conveniently be a meander line antenna (MLA) formed by a meander-line-shaped conductive wire, such as a meander-line-shaped metal or metalized wire (e.g., made of copper, steel, silver, aluminum, etc.—said meander-line-shaped metal/metalized wire could be also conveniently enameled with an insulating polymeric material, such as polyurethane). This allows making a patch RFID device with low gauge/thickness, thereby facilitating tire assembling, avoiding trapped air and reducing scraps, whereas tire durability is not affected by the low gauge/thickness of the patch RFID device. This first preferred embodiment provides long reading distances. Moreover, it is worth noting that, by increasing second antenna's diameter (however, always maintaining its wire antenna configuration), it is possible to increase also fatigue resistance of the second antenna mainly in plane (e.g., with respect to traction in tire building/curing step).

Instead, according to a second preferred embodiment of the present invention, the second antenna can be conveniently formed by:
- a) a straight conductive wire, such as a straight metal or metalized wire (e.g., made of copper, steel, silver, aluminum, etc.)—said straight metal/metalized wire could be also conveniently enameled with an insulating polymeric material, such as polyurethane; or
- b) an assembly of twisted conductive wires, such as an assembly of twisted metal or metalized wires (optionally, enameled with an insulating polymeric material, such as polyurethane); or
- c) an assembly of twisted conductive and non-conductive wires, such as an assembly of twisted fabric and metal/metalized wires (optionally, enameled with an insulating polymeric material, such as polyurethane).

With specific reference to the above options b) and c), the second antenna may conveniently include:
- b1) a straight assembly of twisted conductive wires, or
- c1) a straight assembly of twisted conductive and non-conductive wires;

or otherwise:
- b2) an assembly of twisted conductive wires forming
    - the first portion of the second antenna that partially surrounds the first antenna (e.g., by forming a U-shape) to achieve electromagnetic (preferably, inductive) coupling therewith, and that has two ends located at opposite sides of the first antenna, and
    - the second portion of the second antenna including two straight arms extending in opposite directions from the first antenna, each from a respective end of the first portion of said second antenna; or
- c2) an assembly of twisted conductive and non-conductive wires forming
    - the first portion of the second antenna that partially surrounds the first antenna (e.g., by forming a U-shape) to achieve electromagnetic (preferably, inductive) coupling therewith, and that has two ends located at opposite sides of the first antenna, and
    - the second portion of the second antenna including two straight arms extending in opposite directions from the first antenna, each from a respective end of the first portion of said second antenna.

In particular, if the option c1) or c2) is adopted for the second antenna, a reinforcement mesh (such as a fabric mesh) is conveniently used to cause the assembly of twisted conductive and non-conductive wires to have the aforesaid shapes (i.e., the straight shape of option c1), or the U-shape plus the two straight arms of option c2)). More in detail, the reinforcement mesh is conveniently attached on the RFID chip, the first antenna, the first insulating layer and, at least partially, the second portion of the substrate, and the assembly of twisted conductive and non-conductive wires forming the second antenna is conveniently interlaced with the reinforcement mesh so that said reinforcement mesh causes said assembly of twisted conductive and non-conductive wires to:
- c1) have a straight shape; or
- c2) form
    - a first portion partially surrounding the first antenna and having two ends located at opposite sides of the first antenna, and
    - a second portion including two straight arms extending in opposite directions from the first antenna, each from a respective end of said first portion.

The second preferred embodiment of the present invention allows increasing fatigue resistance of the second antenna in all direction even with small diameter of the second antenna (this is particular advantageous in tire building/curing step). Moreover, this second preferred embodiment allows increasing also assembly fatigue resistance during normal operation/use of the tires.

More in general, the use of the second preferred embodiment of the present invention allows:
- avoiding weaker points at low radius curvatures with respect to the MLA according to the first embodiment, thereby increasing fatigue resistance of the second antenna (both during tire building/curing step and normal operation/use of the tires);
- increasing RFID tag productivity (i.e., faster production); and
- obtaining a more stable geometry and, hence, a more stable performance as for reading distance.

Preferably, the first antenna is a two-dimensional (2D) folded structure.

In view of the foregoing, it is immediately clear to those skilled in the art that different shapes can be advantageously exploited for the first antenna (e.g., loop-like, circular, rectangular, square, meander-line-like, spiral-like, etc.) and the second antenna (which could even cross the first antenna), provided that relative positions of the two antennas (in particular, of the first antenna and of the first portion of the second antenna) allows achieving mutual electromagnetic coupling.

Conveniently, the first antenna is made by applying etching technology on the first insulating layer and is connected to the RFID chip through flip-chip bonding.

Conveniently, the RFID chip is configured to:
- store an univocal identifier assigned to the tire in which the patch RFID device is embedded (and, conveniently, also additional data related to said tire e.g., information items indicating tire model, date and/or place of production, tire materials, etc.);
- receive, via the second and the first antennas, interrogation signals from RFID readers; and
- transmit, via the first and the second antennas, backscattered interrogation signals carrying the univocal identifier (and, conveniently, also the additional data).

Preferably, the RFID chip is configured to perform a self-tuning of its input impedance and/or of the input impedance of the first and second antennas so as to compensate for varying surrounding dielectric/electromagnetic conditions. In this way, the patch RFID device is able to adapt itself to the surrounding dielectric/electromagnetic conditions (for example, it is able to adapt itself to the specific tire which it is embedded in), thereby maximizing its RFID communication performance (e.g., in terms of reading distance). Thanks to the self-tuning capability of the RFID chip, it is possible to design and make a single model of patch RFID device capable of adapting itself to different types of tires. In other words, the self-tuning capability of the RFID chip allows avoiding designing and making antennas with different shapes and lengths depending on different models/types of tires.

Moreover, the RFID chip preferably includes a temperature sensor integrated therein. In this way, in use, when subject to reading by an RFID reader, the patch RFID device is able to provide, in addition to the univocal identifier of the tire in which it is embedded, also temperature values measured by the temperature sensor integrated in the RFID chip.

As for dimensions of the patch RFID device, it may be noted that:

the substrate may conveniently have a thickness comprised between 0.1 and 1.0 mm, preferably between 0.4 and 0.6 mm;

the first and second insulating layers may conveniently have, each, a thickness comprised between 0.001 and 0.01 mm, preferably between 0.002 mm and 0.005 mm;

the optional top rubber layer may conveniently have a thickness comprised between 0.1 and 1 mm, preferably between 0.5 and 1 mm.

Conveniently, the first and second insulating layers may be fitted with one or more holes to let rubber pass through said first and second insulating layers (from the rubber substrate toward the optional top rubber layer or the inner liner of the tire, and vice versa), thereby rendering the patch RFID device more stable.

For a better understanding of the present invention, FIGS. 1A and 1B schematically illustrate two patch RFID devices according to two alternative embodiments of the present invention. In particular, FIGS. 1A and 1B show top views of respectively:

a first patch RFID device (in FIG. 1A denoted as a whole by 1A) fitted with a first MLA (in FIG. 1A denoted by 11A) as second antenna, wherein said first MLA 11A extends partially on the first insulating layer (in FIG. 1A denoted by 13A) and partially on the substrate (in FIG. 1A denoted by 12A); and a second patch RFID device (in FIG. 1B denoted as a whole by 1B) fitted with a second MLA (in FIG. 1B denoted by 11B) as second antenna, wherein said second MLA 11B extends completely on the first insulating layer (in FIG. 1A denoted by 13B).

In this connection, it is important to note that, for the sake of illustration clarity, no second insulating layer and no top rubber layer are shown in FIGS. 1A and 1B so as to provide a clear view of the substrate (denoted by 12A in FIG. 1A and by 12B in FIG. 1B), the first insulating layer 13A, 13B, the RFID chip (in FIGS. 1A and 1B denoted by, respectively, 14A and 14B) and the first antenna (in FIGS. 1A and 1B denoted by, respectively, 15A and 15B).

Figure 2:
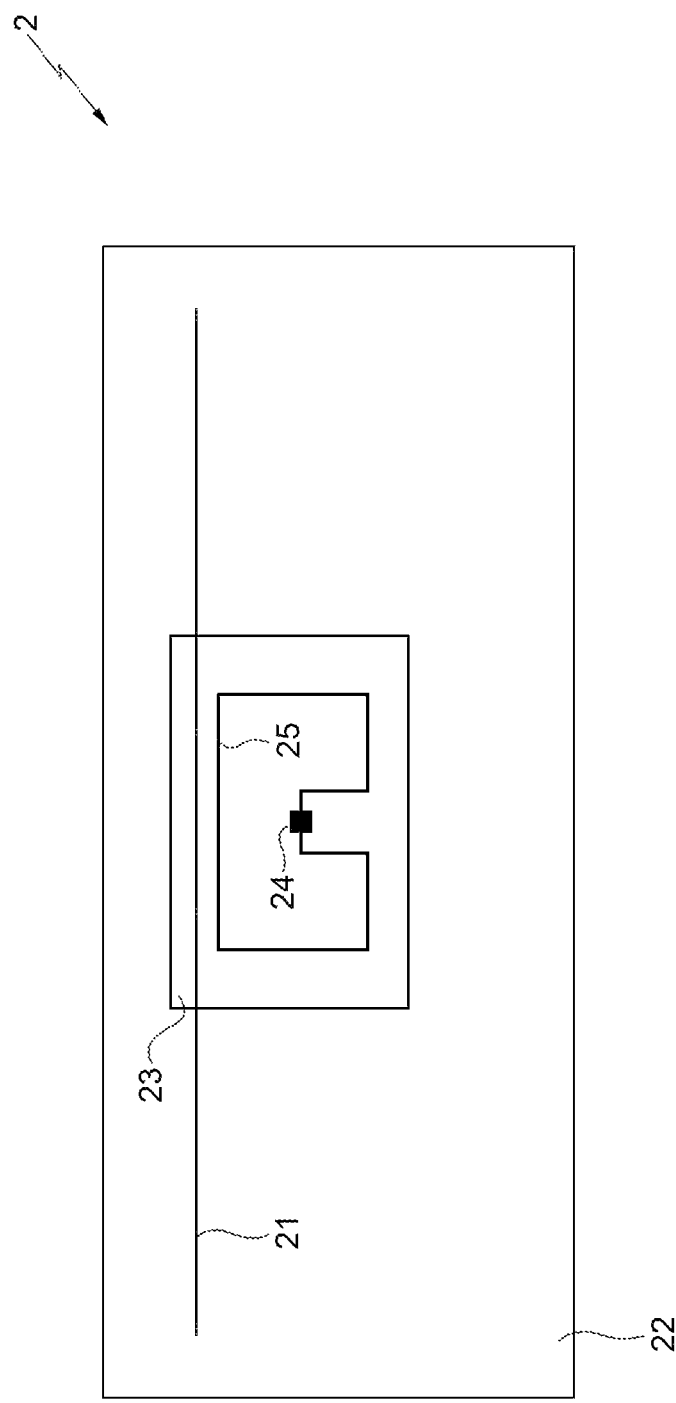
FIG. 2 schematically illustrates a third patch RFID device according to a different illustrative embodiment of the present invention.
Figure 3:
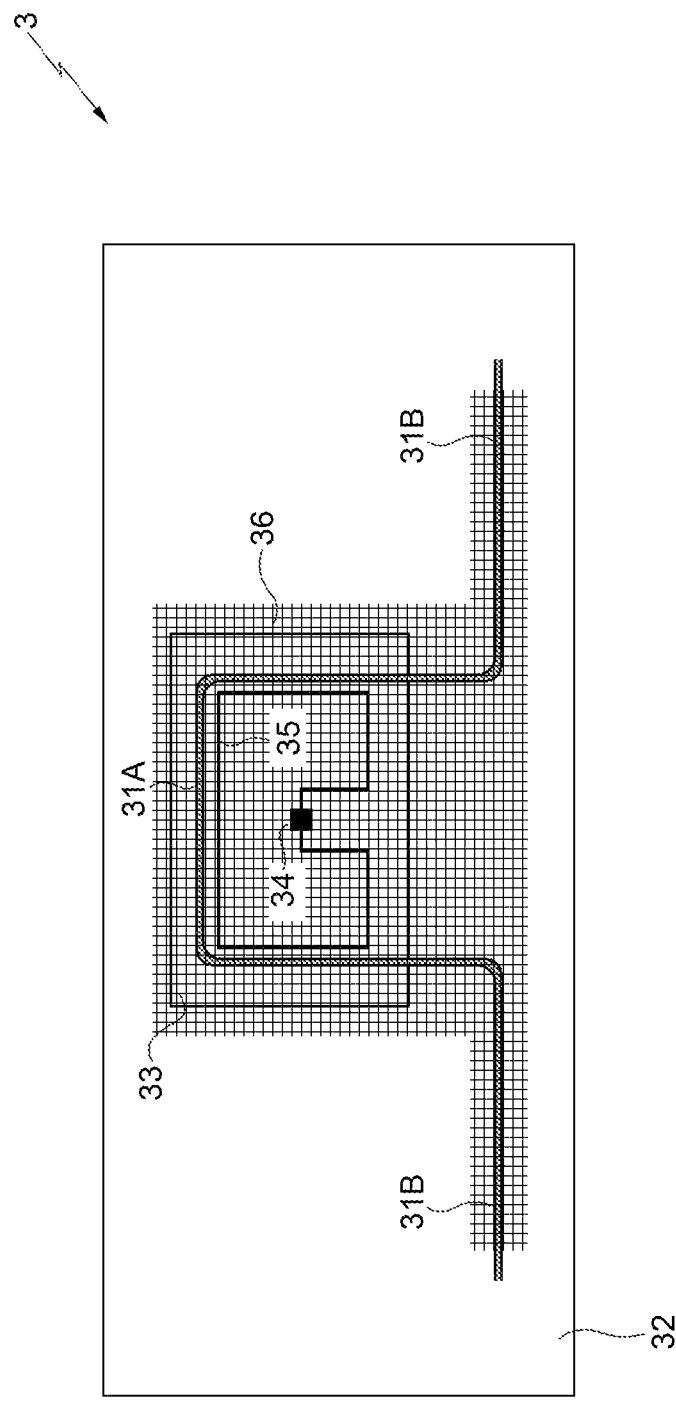
FIG. 3 schematically illustrates a fourth patch RFID device according to a yet different illustrative embodiment of the present invention.

Moreover, FIGS. 2 and 3 schematically illustrate two further non-limiting examples of patch RFID devices based on the teachings of the present invention. In particular, FIGS. 2 and 3 show top views of respectively:

a third patch RFID device (in FIG. 2 denoted as a whole by 2) fitted with a straight parasitic radiator (in FIG. 2 denoted by 21) as second antenna; and a fourth patch RFID device (in FIG. 3 denoted as a whole by 3) fitted with a second antenna formed by an assembly of twisted conductive and non-conductive wires.

Also in connection with FIGS. 2 and 3, it is important to note that, for the sake of illustration clarity, no second insulating layer and no top rubber layer are shown so as to provide a clear view of the substrate (in FIGS. 2 and 3 denoted by, respectively, 22 and 32), the first insulating layer (in FIGS. 2 and 3 denoted by, respectively, 23 and 33), the RFID chip (in FIGS. 2 and 3 denoted by, 24 and 34) and the first antenna (in FIGS. 2 and 3 denoted by, respectively, 25 and 35).

With specific reference to FIG. 3, the second antenna of the fourth patch RFID device 3 includes:

a U-shaped portion 31A that partially surrounds the first antenna 35 to achieve electromagnetic (preferably, inductive) coupling therewith, and that has two ends located at opposite sides of the first antenna 35; and two straight arms 31B that extend in opposite directions from the first antenna 35, each from a respective end of the U-shaped portion 31A;

wherein the U-shaped portion 31A and the two straight arms 31B are made by one and the same assembly of twisted conductive and non-conductive wires, which assembly of twisted conductive and non-conductive wires is interlaced with a reinforcement mesh 36 so that said reinforcement mesh 36 causes:

the U-shaped portion 31A to have and maintain its U-shape; and the two straight arms 31B to have and maintain their straight shape.

It is important to note that, according to alternative versions of the third and fourth patch RFID devices 2 and 3, the second antenna (respectively formed by a straight parasitic radiator or by an assembly of twisted conductive and non-conductive wires) might conveniently extend completely on the first insulating layer that, in this case, would have larger planar size (additionally, the second antenna being completely covered by the second insulating layer having larger planar size too).

More in general, the use of a second antenna completely or partially sandwiched between the first and the second insulating layers (with corresponding larger or smaller planar size thereof) has pros and cons. Namely, the use of first and second insulating layers with larger planar size and with the second antenna completely sandwiched therebetween allows protecting more effectively the second antenna, even if this advantage might be paid in terms of slightly less flexibility of the multilayer planar structure. On the other hand, the use of smaller planar size for the first and second insulating layers, whereby the second antenna is sandwiched partially between said first and second insulating layers and partially between the substrate and the top rubber layer/tire's inner liner, allows increasing flexibility of the multilayer planar structure (unfortunately, this might be paid in terms of more fragility of the second antenna at the edge between the sandwich formed by the first and second insulating layers and the sandwich formed by the substrate and the top rubber layer/tire's inner liner).

From the foregoing, the technical advantages and the innovative features of the present invention are immediately clear to those skilled in the art.

In particular, it is important to point out that the present invention provides, in general, a patch RFID device for tires with enhanced performance and features with respect to those of currently known solutions and, in particular, such that to avoid causing damages to tires or to cords thereof.

Furthermore, many additional technical advantages of the present invention, and also of specific optional features thereof, have been previously explained in detail.

In conclusion, it is clear that numerous modifications and variants can be made to the present invention, all falling within the scope of the invention, as defined in the appended claims.

The invention claimed is:

1. A patch radiofrequency identification device for tires, designed to be applied to an inner liner of a tire before or after tire vulcanization/curing and comprising a flexible multilayer planar structure including:

a substrate;

a first insulating layer covering a first portion of the substrate, thereby leaving exposed a second portion thereof extending around said first portion;

a radiofrequency identification chip and a first antenna that are connected to each other and arranged on the first insulating layer;

a second antenna that is electromagnetically coupled with the first antenna and that extends, at least partially, on the first insulating layer; wherein the radiofrequency identification chip, the first antenna, and the second antenna lie on a same plane;

wherein the second antenna is a parasitic radiator and includes:
 a first portion that extends on the first insulating layer and is covered by the second insulating layer; and
 a second portion that extends from the first portion on the first insulating layer and is covered by the second insulating layer, or extends from the first portion on the second portion of the substrate and is not covered by the second insulating layer; and a second insulating layer covering the first insulating layer, the radiofrequency identification chip, the first antenna and, at least partially, the second antenna;

the first antenna is a two-dimensional folded structure and the second antenna is formed by an assembly of twisted conductive and non-conductive wires;

the first antenna and the first portion of the second antenna are relatively positioned so as to achieve electromagnetic coupling there between;

the first portion of the second antenna includes two ends located at opposite sides of the first antenna;

the second portion of the second antenna includes two straight arms extending in opposite directions from the first antenna, each from a respective end of the first portion of the second antenna;

the multilayer planar structure further includes a reinforcement mesh attached on the radiofrequency identification chip, the first antenna, the first insulating layer and, at least partially, the second portion of the substrate; and the assembly of twisted conductive and non-conductive wires is interlaced with the reinforcement mesh so that the reinforcement mesh causes the assembly of twisted conductive and non-conductive wires to maintain shapes of the first portion and the second portion of the second antenna.

2. The patch radiofrequency identification device of claim 1, wherein the multilayer planar structure further includes a top rubber layer covering the second insulating layer and the second portion of the substrate, wherein said top rubber layer is designed to be applied to an inner liner of a tire.

3. The patch radiofrequency identification device of claim 2, wherein the first insulating layer is attached to the substrate via a first adhesive material/layer, and the top rubber layer is attached to the second insulating layer via a second adhesive material/layer.

4. The patch radiofrequency identification device of claim 1, wherein the multilayer planar structure is designed to be applied to an inner liner of a tire so that the inner liner covers the second insulating layer and the second portion of the substrate.

5. The patch radiofrequency identification device of claim 4, wherein the first insulating layer is attached to the substrate via a first adhesive material/layer, and the inner liner is attached to the second insulating layer via a second adhesive material/layer.

6. The patch radiofrequency identification device of claim 1, further comprising a patch formed by two or more layers, wherein said patch encapsulates the multilayer planar structure and is designed to be applied to an inner liner of a tire.

7. The patch radiofrequency identification device of claim 1, wherein the first antenna is designed to operate as a near-field coupler, and the second antenna is designed to operate as a far-field radiating antenna.

8. The patch radiofrequency identification device of claim 1, wherein the second antenna is a meander line antenna formed by a meander-line-shaped conductive wire.

9. The patch radiofrequency identification device of claim 1, wherein the radiofrequency identification chip is configured to:
 store an univocal identifier assigned to the tire in which the patch radiofrequency identification device is embedded;
 receive, via the second antenna and the first antenna, interrogation signals from radiofrequency identification readers; and
 transmit, via the first antenna and the second antenna, backscattered interrogation signals carrying the univocal identifier.

10. The patch radiofrequency identification device of claim 1, wherein the radiofrequency identification chip is configured to perform a self-tuning of a respective input impedance and/or of an input impedance of the first antenna and the second antenna so as to compensate for varying surrounding dielectric/electromagnetic conditions.

11. The patch radiofrequency identification device of claim 1, wherein:
 a temperature sensor is integrated in the radiofrequency identification chip to measure temperature values; and
 the radiofrequency identification chip is configured to transmit, via the first antenna and the second antenna, backscattered interrogation signals carrying the temperature values measured by the temperature sensor.

12. The patch radiofrequency identification device of claim 1, wherein a protective resin is interposed between:
 the radiofrequency identification chip and the first antenna; and
 the second insulating layer.

13. The patch radiofrequency identification device of claim 1, wherein the substrate is made of rubber, or of one or more polymeric materials, or of paper, or of textile/fabric.

14. A tire fitted with the patch radiofrequency identification device of claim 1.

15. The tire of claim 14, wherein:
 the multilayer planar structure further includes a top rubber layer covering the second insulating layer and the second portion of the substrate;
 the top rubber layer is applied to an inner liner of the tire;
 the first insulating layer is attached to the substrate via a first adhesive material/layer; and
 the top rubber layer is attached to the second insulating layer via a second adhesive material/layer.

16. The tire of claim 14, wherein:
 the multilayer planar structure is applied to an inner liner of the tire so that the inner liner covers the second insulating layer and the second portion of the substrate,
 the first insulating layer is attached to the substrate via a first adhesive material/layer; and
 the inner liner is attached to the second insulating layer via a second adhesive material/layer.

17. The tire of claim 14, further comprising a patch formed by two or more layers, wherein the patch encapsulates the multilayer planar structure and is applied to an inner liner of the tire.

18. The tire of claim 14, wherein the first antenna is designed to operate as a near-field coupler, and the second antenna is designed to operate as a far-field radiating antenna.

19. The tire of claim 14, wherein the radiofrequency identification chip configured to:
- store an univocal identifier assigned to the tire;
- receive, via the second antenna and the first antenna, interrogation signals from radiofrequency identification readers; and
- transmit, via the first antenna and the second antenna, backscattered interrogation signals carrying the univocal identifier.

20. The tire of claim 14, wherein the radiofrequency identification chip is configured to perform a self-tuning of a respective input impedance and/or of an input impedance of the first antenna and the second antenna so as to compensate for varying surrounding dielectric/electromagnetic conditions.

* * * * *